Figure 1:
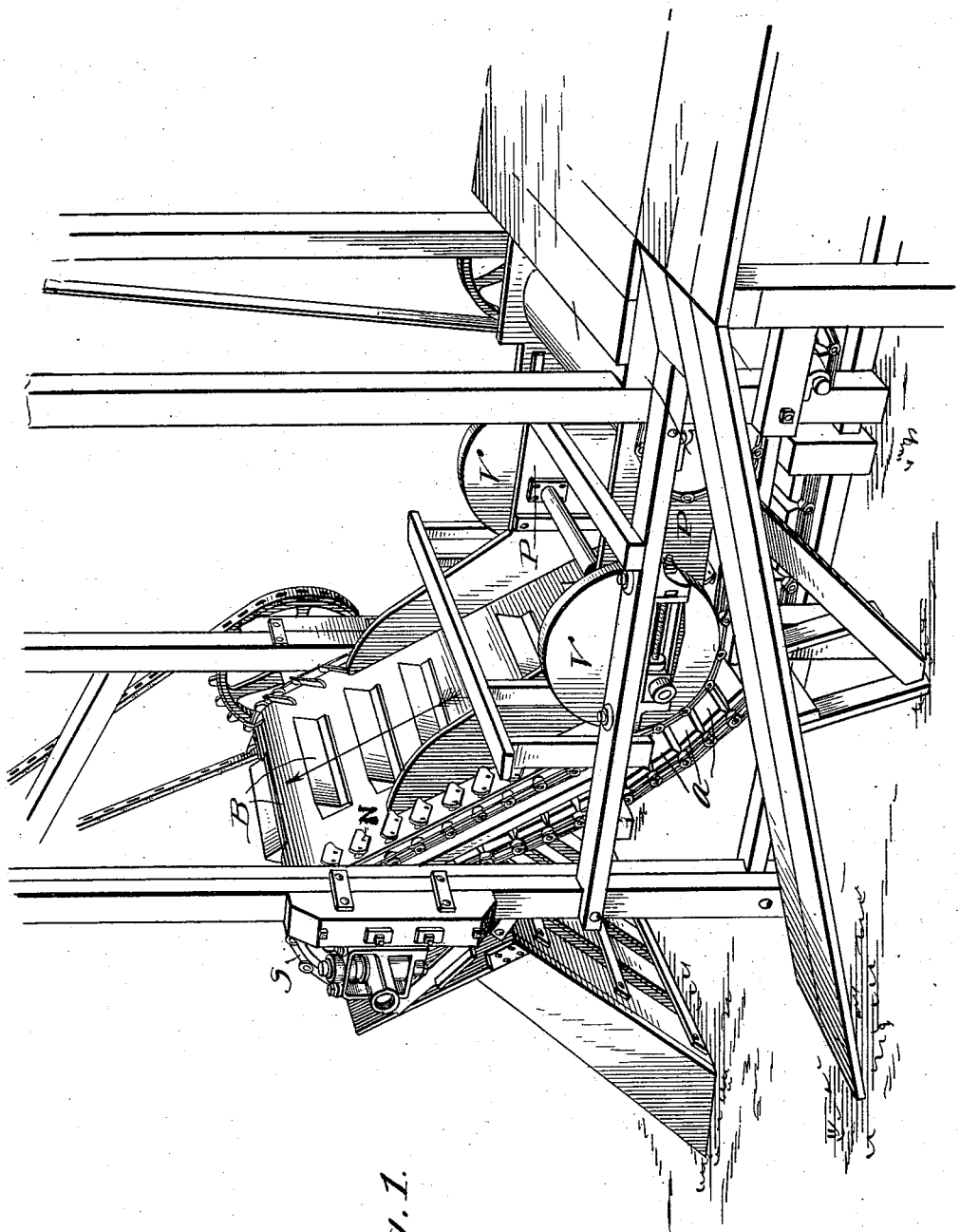

J. J. GREEN.
FEEDING MACHINE.
APPLICATION FILED JUNE 29, 1911.

1,019,040.

Patented Mar. 5, 1912.
2 SHEETS—SHEET 1.

WITNESSES

INVENTOR
Joshua J. Green
By
Attorney

J. J. GREEN.
FEEDING MACHINE.
APPLICATION FILED JUNE 29, 1911.
1,019,040.
Patented Mar. 5, 1912.
2 SHEETS—SHEET 2.
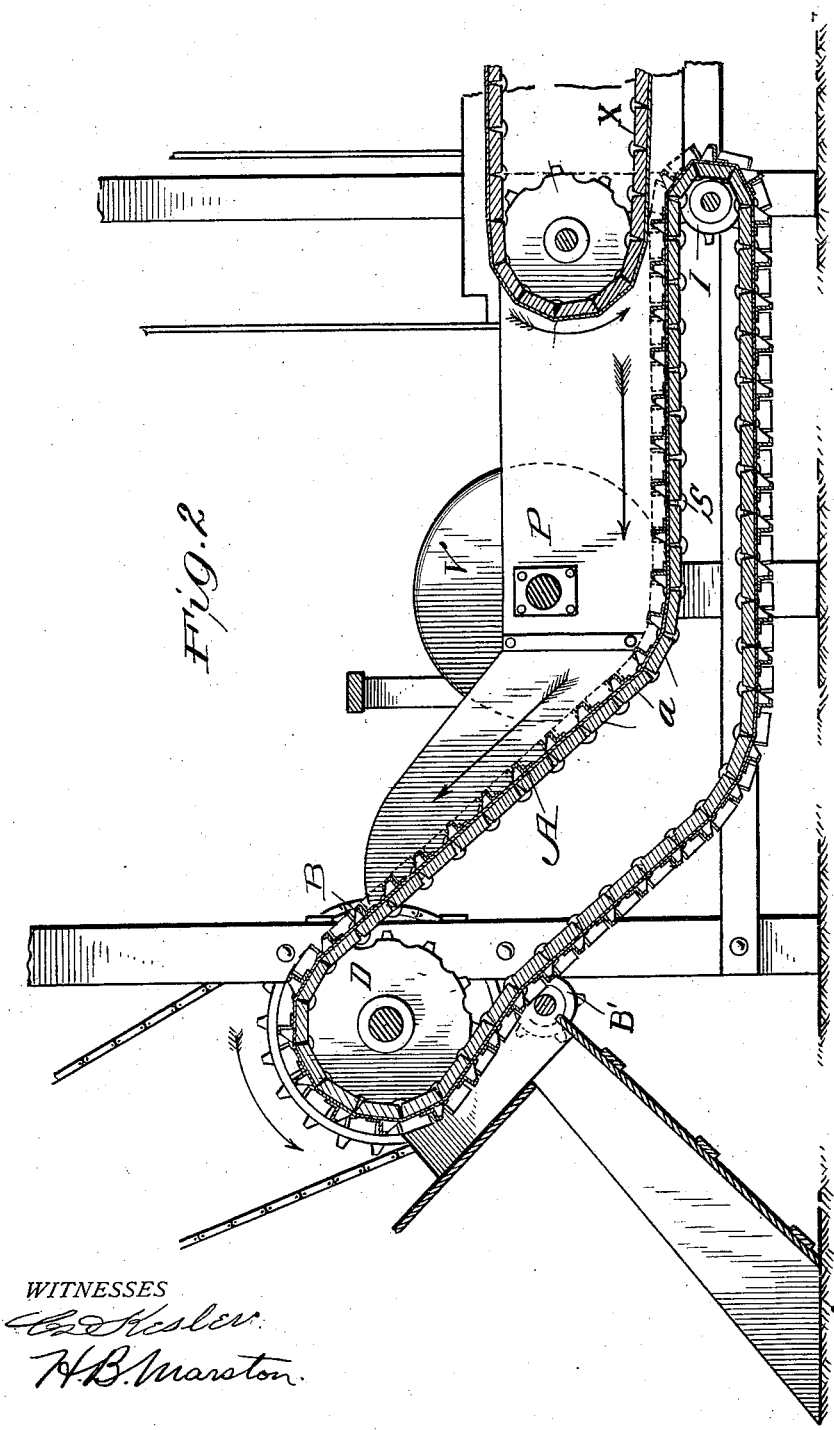
WITNESSES
INVENTOR
Joshua J. Green
By
Attorney

UNITED STATES PATENT OFFICE.

JOSHUA J. GREEN, OF SHREVEPORT, LOUISIANA.

FEEDING-MACHINE.

1,019,040.  Specification of Letters Patent.  Patented Mar. 5, 1912.

Application filed June 29, 1911. Serial No. 635,990.

*To all whom it may concern:*

Be it known that I, JOSHUA J. GREEN, residing in Shreveport, parish of Caddo, and State of Louisiana, have invented a new and useful Improvement in Feeding-Machines, of which the following is a specification.

My invention relates to machines or apparatus designed more particularly to feed or deliver in regulated quantities as desired mixed comminuted stuff such as used in the preparation of fertilizers, cements, feed, etc., but which can also be used for the purpose of feeding and delivering other materials.

In my machine there is employed a power driven endless conveyer apron, which, in conjunction with guide wheels for describing the course of the apron, and stationary side walls, constitute a reservoir from which the material is delivered by buckets mounted on and carried by the apron—inclined cups or flights being provided upon those portions of the apron exterior to the side walls, to catch such materials as may creep under the side walls, and to return the same to the reservoir.

My invention consists in the novel construction and arrangement of devices for the purpose which will first be described in connection with the accompanying drawings, and will then be more particularly pointed out in the claims.

In the drawings—Figure 1 is a perspective view of a feeding machine embodying my improvements. Fig. 2 is a vertical central section of the same.

A is the endless apron, consisting of sprocket chains, between which extend, and to which are appropriately attached cross slats *a* (overlapping if desired). For use with acid materials, such as for example as used in the manufacture of fertilizers, the apron may have a canvas cover saturated with paraffin to resist the action of the acid. Other constructions of apron may be employed, depending measurably upon the kind of material to be handled.

The course of the apron is from the idler sprockets I, at the front end of the machine, or that end of the machine at which the material is delivered to the machine, to the driving sprockets D, at the other end of the machine, the course of the upper ply of the apron between these two points being determined by the idler wheel guide V (preferably of wood), which are suitably mounted in the frame of the machine to meet the sprocket chains S of the apron. The portion of the upper ply of the apron between the idler sprockets I and the guide wheels V is horizontal and forms the floor of the reservoir. Between the wheels V, and the driving sprockets D (which are at some elevation above the floor of the reservoir) the upper ply of the apron rises in a slanting direction, forming an inclined rear wall for the reservoir up over which the material to be fed or delivered from the machine passes, it being thus conveyed by means of buckets B secured to and traveling with the apron, such material as is not caught by the buckets falling back by gravity into the reservoir from the upwardly traveling back portion of the reservoir. Idler sprockets, for the under ply of the apron, may be located at a point corresponding to that at which the guide wheels V are located. The driving sprockets D and the apron, move in the direction of the arrow in Fig. 1.

The guide wheels V are exterior to the side walls P of the reservoir. These walls are stationary walls, suitably attached and held in place in the frame of the machine. They extend parallel with one another from the front end of the machine about, say two thirds up the inclined back wall of the reservoir, their longitudinal lower edges conforming in contour to that of the moving apron, which moves below them. These edges are set in as close proximity to the face of the apron, as practicable, to prevent escape of material from the reservoir at that point as far as possible. Such material as may creep out from under the side walls will be caught by inclined cups or flights N, attached to the apron outside the side walls, and will by these cups be carried up to the point where the side walls end, at which point the material will by gravity discharge from said buckets or flights and return to the reservoir. The material to be handled by the machine is dumped upon the front of the apron by any suitable means, as for example by an endless conveyer typified at X, Fig. 2.

I have designed this machine with more particular reference to its use in connection with the mixing machine described in my application filed June 29, 1911, Serial #635,989. But it can of course be used alone, or in other connections. In order to keep the apron clear and unclogged, I prefer to employ in connection with the lower or return ply, a suitable device for agitating or jolting the same. This device is typified at B', and it may consist of idler "bumper" or "knocker" sprockets which engage the sprocket chains and act in conjunction therewith to effect the continuous agitation of the apron as set forth in my aforesaid application Serial #635,989 in respect of like sprockets there designated by like characters.

Having described my improvement and the best way now known to me of carrying the same into practical effect, I state in conclusion that I do not restrict myself to the structural details hereinbefore illustrated and set forth, since manifestly the same can be varied without departure from the principle of my invention: But

What I claim herein as new and desire to secure by Letters Patent is as follows:

1. In a machine of the character described an endless power driven apron; supporting and guide wheels directing the course of the upper ply of said apron, to form a horizontal floor, and an upwardly rising inclined back wall leading from said horizontal portion; stationary parallel side pieces constituting the side walls of a reservoir of which the upper ply constitutes the floor and inclined rear wall; said upper ply at each edge extending closely beneath and laterally beyond said side walls, and the guide wheels at the angle between the inclined and horizontal portion of said upper ply being upon exterior opposite sides of the reservoir and bearing upon the marginal portions of the apron which project laterally beyond the reservoir walls; and delivery buckets, secured to and moving with the apron, and located upon that portion of the same which intervenes between the stationary side walls of the reservoir, substantially as and for the purposes hereinbefore set forth.

2. In a machine of the character described, an endless power driven apron; supporting and guide wheels directing the course of the upper ply of the apron to form a horizontal portion and an upwardly rising inclined portion leading from said horizontal portion; stationary parallel side pieces secured in the frame of the machine and extending lengthwise above, and in close proximity to, said portions of the apron, and constituting the side walls of a reservoir of which the said portions of the apron constitute the floor and inclined rear wall; delivery buckets secured to and moving with the apron, and located upon that portion of the same which intervenes between the stationary side walls; and inclined flights located on the apron outside of and in close proximity to the side walls and operating to catch such material as may creep out from under the side walls, and return the same to the reservoir, substantially as and for the purposes hereinbefore set forth.

In testimony whereof I affix my signature in presence of two witnesses.

JOSHUA J. GREEN.

Witnesses:
  R. P. MOORE,
  ED SEAMAN.